No. 664,079. Patented Dec. 18, 1900.
P. J. FRIEL.
EGG BOILER.
(Application filed May 21, 1900.)

(No Model.)

Witnesses
George Mverta
Joseph J Carroll

Inventor
Patrick Joseph Friel.
per
J. C. Lemow
Attorney

THE NORRIS PETERS CO., PHOTO-LITHO., WASHINGTON, D. C.

UNITED STATES PATENT OFFICE.

PATRICK JOSEPH FRIEL, OF CINCINNATI, OHIO.

EGG-BOILER.

SPECIFICATION forming part of Letters Patent No. 664,079, dated December 18, 1900.

Application filed May 21, 1900. Serial No. 17,498. (No model.)

*To all whom it may concern:*

Be it known that I, PATRICK JOSEPH FRIEL, a citizen of the United States, and a resident of Cincinnati, in the county of Hamilton and State of Ohio, have invented an Improvement in Egg-Boilers; and I do hereby declare that the following is a full and exact description thereof, reference being had to the accompanying drawings, making part of this specification.

My invention relates to egg-boilers; and it has for its object the improvement in the construction of such devices whereby they are simplified and rendered more efficient in action.

The novelty of my invention consists in the combination and subcombination of the parts, as will be hereinafter set forth, and specifically pointed out in the claim.

Figure 2:
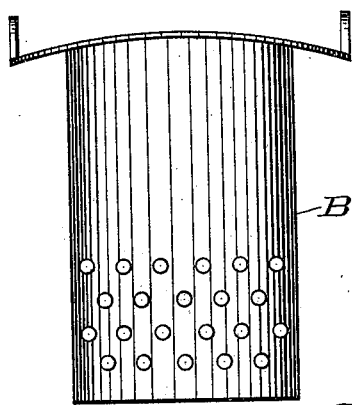
Figure 6:
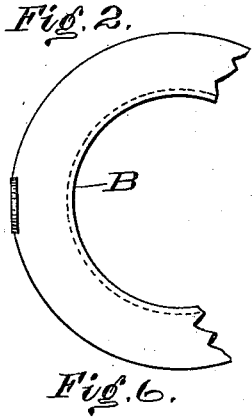
Figure 1:
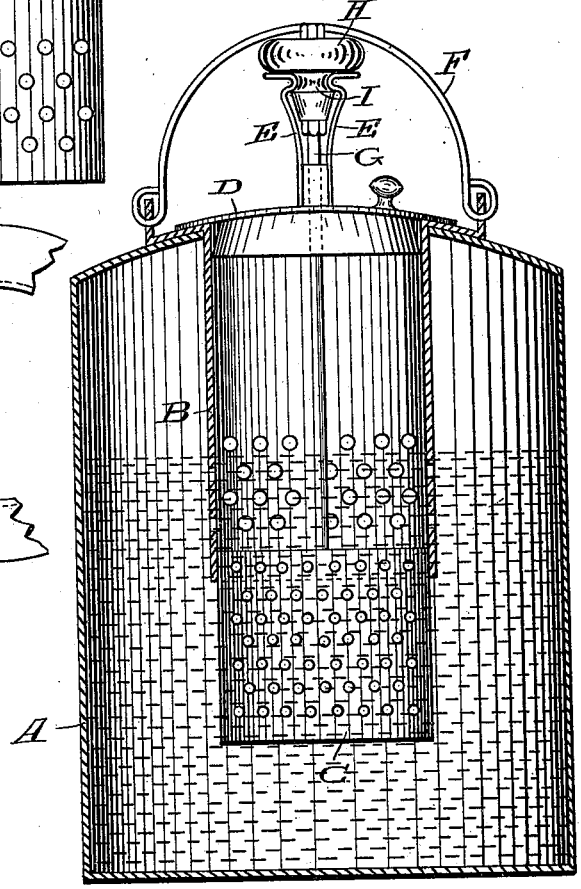
Figure 3:
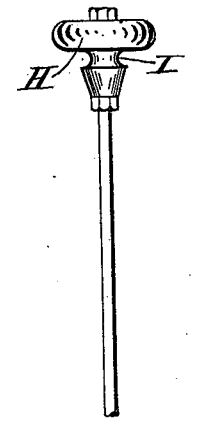
Figure 3:
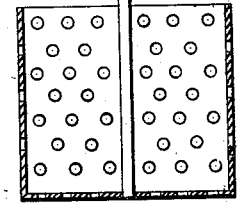
Figure 4:
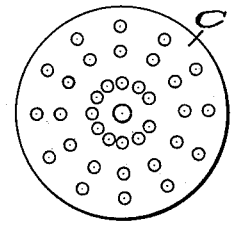
Figure 5:
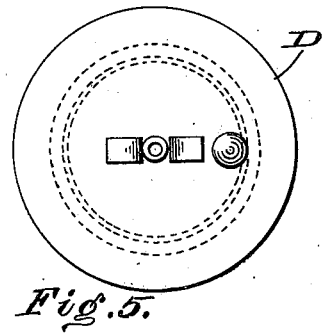

In the accompanying drawings, Figure 1 is a central vertical section of a boiler, the basket C and lid D being in side elevation. Fig. 2 is a side elevation of cylinder B with the bail F removed. Fig. 3 is a side elevation of basket C and rod G, the basket being in section. Fig. 4 is a bottom view of the basket C. Fig. 5 is a plan view of the lid D. Fig. 6 is a plan view of Fig. 2 with a portion broken away.

Similar letters of reference indicate like parts throughout the several drawings.

A is an ordinary pot or boiler in which the tube B is inserted. The lower part of the tube B is perforated to permit a free circulation of the water. The upper part of the tube B has a wide flange, so that it will cover the openings of different-sized boilers. The perforated basket C is made so that it will pass down through the tube B. The top of the perforated basket will not go below the bottom of tube B. The perforated basket C is provided with a lid D, which slides up and down on the rod G. This lid D is provided with two springs E E, which catch in the recess I of the knob H.

The operation of my egg-boiler is as follows: The tube B is placed in the boiler A, which has been previously filled with water. Eggs are placed in the perforated basket C, when the basket is inserted in the tube B and lowered into the water. The lid D covers the top opening of the tube B, and the knob H prevents the basket going down too low in the tube B. The water is brought to a boiling-point. When the eggs have remained in the water a sufficient length of time, they are removed by taking hold of the knob H and lifting the basket out. The lid D slides down the rod G and closes down over the eggs, preventing any from falling out of the basket. When the operator wishes to remove the eggs from the basket, the lid D is raised up until the springs E E engage with the recess I, when the eggs can be readily removed.

Having thus described my invention, what I claim as new, and desire to secure by Letters Patent, is—

The combination in an egg-boiler of a boiler A with a perforated tube B suspended in the same, the tube B in turn having a basket C suspended in it, the basket C being provided with a rod G provided with a groove I for lifting the basket out of the tube B, the rod G having a knob H attached to the upper end, the rod G also having a lid D arranged to slide up and down on it, the lid D having two springs E, E, arranged to engage in the groove I of the knob H, all substantially as described.

PATRICK JOSEPH FRIEL.

Witnesses:
JOSEPH J. CARROLL,
GEORGE MOESTA.